Nov. 20, 1962

H. C. MEAD ET AL 3,065,340

SHOCK ABSORBING LAMP MOUNTING

Filed April 11, 1960

INVENTORS
Howard C. Mead &
BY George W. Onksen

G. E. McGlynn Jr.
ATTORNEY

Nov. 20, 1962 H. C. MEAD ET AL 3,065,340
SHOCK ABSORBING LAMP MOUNTING
Filed April 11, 1960 2 Sheets-Sheet 2
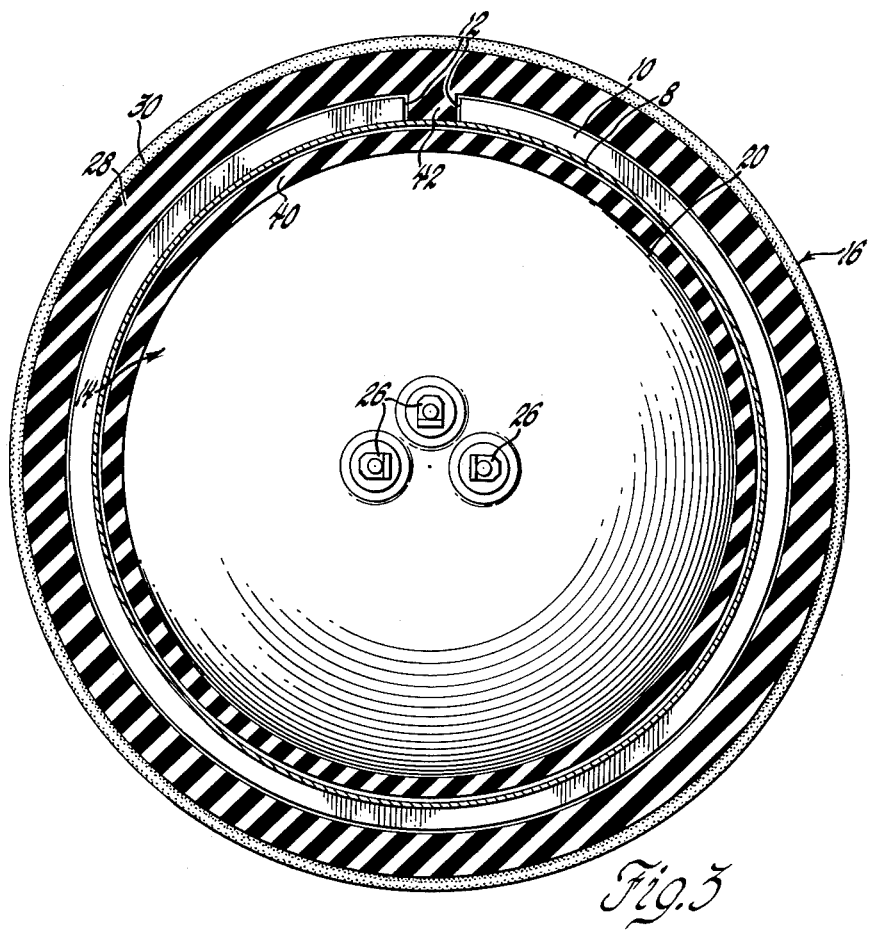
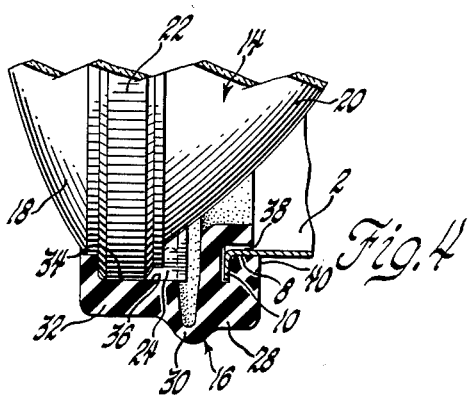
INVENTORS
Howard C. Mead &
BY George W. Onksen
G.E. McGlynn Jr.
ATTORNEY

United States Patent Office 3,065,340
Patented Nov. 20, 1962

3,065,340
SHOCK ABSORBING LAMP MOUNTING
Howard C. Mead and George W. Onksen, Anderson, Ind., assignors to General Motors Corporation, Detroit, Mich., a corporation of Delaware
Filed Apr. 11, 1960, Ser. No. 21,379
1 Claim. (Cl. 240—41.5)

The present invention pertains to a shock absorbing lamp assembly and mounting and, in particular, to such an assembly comprising yieldable gasket means for resiliently supporting an all-glass lamp unit such as a vehicle headlamp from its associated housing.

Lamp assemblies of the type herein contemplated typically comprise a metal body or housing adapted to receive and support a suitable lamp unit such as the modern day all-glass seal beam headlamp which includes a sealed reflector and lens forming an envelope enclosing one or more filaments supported on fixed lead wires. The lives of such lamp units have been found to be rather short when mounted upon certain heavy duty vehicles such as agricultural tractors, crawler tractors, scrapers and the like which, during operation, subject the assembly and lamp unit to severe vibrations. When used on such vehicles, such lamp assemblies tend to vibrate so severely and with such great amplitude that the lamp unit fails. The particular point of failure may vary but quite often it results from intermeshing or touching of the respective lamp filaments thereby resulting in shorting of the latter.

Due to this problem, efforts have been expended to isolate the lamp unit from the aforementioned vehicle vibrations. In this regard, it has been proposed to relatively rigidly mount the lamp unit itself in its associated metal body or housing, and then resiliently support the housing upon the vehicle by means of yieldable packings, springs and the like. While some such prior art mountings have tended to reduce the imposition of vibrations on the various optical components of the lamp assembly, they have not been completely satisfactory. More specifically, it has become apparent that, although these prior art shock mountings have absorbed some vibrations, the lamp assembly and particularly the lamp unit and the optical elements thereof have often been vibrated at one or more of their natural resonant frequencies thereby resulting in the breakage and failure aforementioned.

It is, therefore, a principal object and feature of this invention to provide an improved shock absorbing lamp assembly in which the lamp unit itself is entirely resiliently supported or suspended from its associated housing which, in turn, may be rigidly supported upon the vehicle.

It is yet another object and feature of this invention to provide such a lamp assembly including an integral annular resilient gasket having a base portion adapted to grippingly receive the lamp body and housing, an annular lip portion adapted to grippingly receive and suspend the entire lamp unit relative to the body, and an otherwise flexibly free neck portion of a gasket intermediate its base and lip portions to more effectively absorb vibrations which would otherwise be transmitted from the lamp body to the lamp unit.

It is yet another object and feature of this invention to provide a shock absorbing gasket of the type aforementioned which further includes an annular bellows-like flexibly free neck portion which will more effectively absorb vibrational forces imposed radially and axially thereof so as to prevent vibration of the lamp unit and its optical components at frequencies above the critical frequency or frequencies at which the problem of damage is encountered.

These and other objects of the invention and the manner in which they are attained will become more apparent hereinafter as the description of the invention proceeds, and in which reference is made to the drawings in which:

FIGURE 3 is a view taken on line 3—3 of FIGURE 1; and

FIGURE 4 is a view taken on line 4—4 of FIGURE 1.

Figures 1, 2:
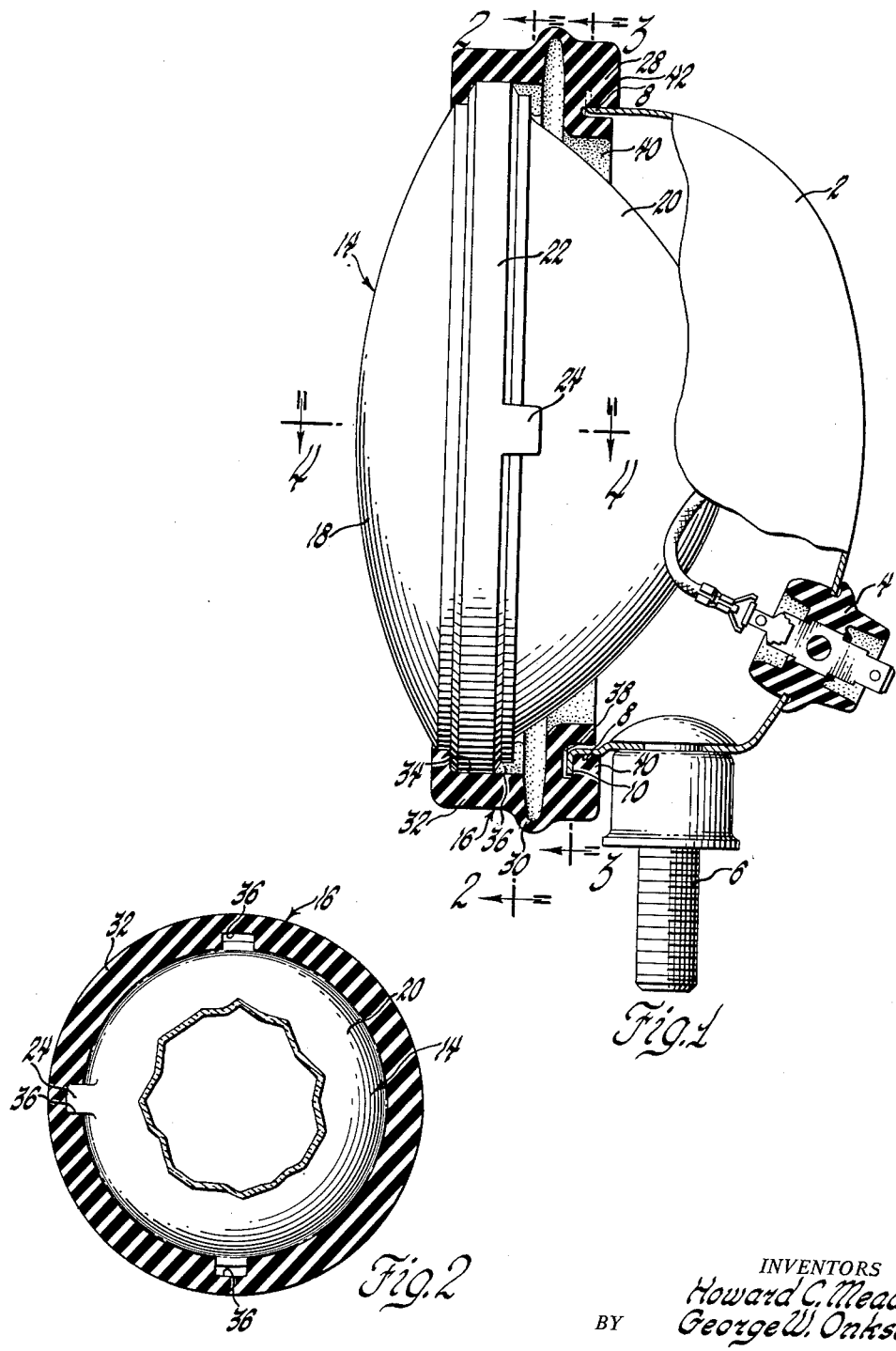
FIGURE 1 is an elevation, partly in section and partly broken away, of a preferred embodiment of the invention.
FIGURE 2 is a view taken on line 2—2 of FIGURE 1, and reduced in size.

Referring now to the drawings, the numeral 2 indicates a cup-like metal body or housing having a generally axially extending annular open end. In a manner well known in the art, suitable electrical connecting means 4 is mounted on the rearward portion of the body, and is adapted to be connected through suitable conductors to the usual terminal structure on the lamp unit to be described. Additionally, the fastening means 6 is carried by the housing 2 and is adapted to be connected to a structural body portion of the vehicle with which the lamp assembly is to be used. The generally axially extending open end of the housing 2 is defined by an annular or circumferentially extending gasket seat 8 formed in part by the integral radially outwardly directed annular locking flange 10 having a locating notch 12 formed therein.

The all-glass seal beam lamp unit indicated generally at 14 is adapted to be resiliently suspended from the housing 2 by the annular resilient shock absorbing gasket indicated generally at 16. The lamp unit 14 is conventional in construction in that it includes a lens 18 and reflector 20 having their peripheral edges fused or sealed to form the annular radially outwardly directed lamp mounting flange 22 from which at least one locating lug 24 projects axially rearwardly toward the body 2. As will be apparent to those skilled in the art, the sealed lens and reflector form an envelope enclosing suitable lead wires and filaments electrically connected to a power source through the usual terminal structure 26 to provide the light rays emanating from the lamp.

The integral annular resilient gasket 16, which preferably is composed of fifty or sixty durometer neoprene, includes an annular resilient base portion 28, a flexibly free short neck portion including the radially outwardly directed bellows section 30 formed integral with and extending axially from the base portion 28, and the annular resilient lip portion 32 formed integral with and extending axially from the aforementioned neck or bellows portion 30. The lip portion 32 is provided on its inner surface with an annular lamp-receiving or seating surface 34 grippingly engaging lamp flange 22 and a plurality of spaced locating notches 36, one of which receives lug 24.

The base portion of the gasket is provided with a generally L-shaped locking groove 38 and an annular radially inwardly directed locking flange 40 adapted to grippingly receive and engage the gasket seat 8 and the locking flange 10. The locating lug 42 on the gasket base portion is adapted to be seated within the locating notch 12 of locking flange 10 of the metal housing 2.

Thus, it may be seen that the sealed lamp unit 14 is resiliently suspended from the open end of the housing 2 by means of the resilient gasket 16 adapted to grippingly engage, respectively the mounting seat 8 and locking flange 10 of the lamp and the mounting flange 22 of the lamp unit. The construction and arrangement of the resilient gasket, and with particular regard to the flexibly free bellows portion 30, is such that it will absorb shock or vibrational forces imposed in radial and axial planes; in other words, the gasket neck portion is movable or flexible radially and axially relative to the gasket base portion 28 and body 2 so as to absorb forces imposed in these planes on body 2.

By way of further illustration of the function and significance of the aforementioned resilient gasket, reference may be made to vibration tests conducted on the sealed lamp unit 14 which, it will be understood, is of the conventional type previously described and commonly employed in this environment. These vibration tests demonstrate that a lamp unit 14 of the type described or the optical elements thereof have certain critical resonant frequencies of vibration at which the filaments or lead wires or both may be damaged. While the critical resonant frequency or frequencies may quite well vary among lamps of different manufacture and depending upon whether it is a single or double filament lamp, it may nevertheless be said that there are one or more critical resonant frequencies for any given lamp. For the lamp disclosed, the critical resonant frequencies of the lead wire-filament assemblies have been found to occur at approximately 180, 540 and 630 cycles per second. Consequently, if such a lamp is then mounted within its housing and the latter is subjected to a wide range of vibration frequencies which encompass one or more of the critical resonant frequencies aforementioned, the lamp unit 14 or the lead wire-filament assemblies tend to vibrate sympathetically resulting in breakage or damage to the lamp unit or its components. Consequently, it is the function of the aforementioned resilient gasket 16, through its shock absorbing properties in the radial and axial planes, to absorb vibrations imposed on the lamp unit to prevent achievement of the critical resonant frequencies and reduce the amplitude of movement of the lamp unit.

As aforementioned, the resilient gasket 16 is preferably composed of either fifty or sixty durometer neoprene. When the sealed lamp unit 14 is assembled within the resilient gasket and mounted on the housing as illustrated in FIGURE 1 of the drawings, it has been found that this gasket results in a superior shock absorbing performance. Thus, using the bellows design of FIGURE 1 in which the resilient gasket is of fifty durometer rubber results in a single natural frequency of the lamp assembly of approximately 55 cycles per second which is far below the lowest critical resonant frequency of the lead wire-filament assembly of 180 cycles per second as mentioned above. With sixty durometer rubber employed in the resilient gasket 16, the single point of resonance of the lamp assembly shown in FIGURE 1 is at approximately 60 cycles per second, again much lower than the critical resonant frequency of the lead wire-filament assembly. Moreover, after subjecting the housing 2 to vibrations up to approximately 1,000 cycles per second, only one such point of natural frequency of the lamp assembly has been found. Furthermore, with the housing 2 vibrated up to approximately 1,000 cycles per second, it has been found that practically no vibratory motion is imparted to the unit 14 at the critical resonant frequencies of the lamp filament-lead wire assemblies as aforementioned.

While but one form of the invention has been selected for an illustration thereof, other forms will now be apparent to those skilled in the art. Therefore, the embodiment shown in the drawing is merely for illustrative purposes, and is not intended to limit the scope of the invention which is defined by the claim which follows.

We claim:

A shock absorbing lamp assembly comprising a housing generally open in an axial direction, an annular gasket seat at the open end of said housing and including a radially outwardly directed annular locking flange having a locating notch therein, an annular resilient gasket having a base portion mounted on said gasket seat and including an annular locking groove grippingly engaging said locking flange and a locating lug disposed within said locating notch, a flexibly free neck portion on the gasket including an annular bellows integral with and extending axially from the base portion of said gasket, an annular lip portion on the gasket integral with and extending axially beyond said neck portion and having an annular lamp seat on its inner surface, and a sealed lamp unit resiliently supported by the gasket and having an annular radially outwardly directed mounting flange grippingly received by said gasket lamp seat, said gasket neck portion including said bellows being flexible radially and axially relative to said housing in response to shocks imposed on the latter.

References Cited in the file of this patent

UNITED STATES PATENTS

| 1,862,285 | Terry et al. | June 7, 1932 |
| 2,225,980 | Casson | Dec. 24, 1940 |
| 2,225,981 | Casson | Dec. 24, 1940 |
| 2,800,578 | Falge | July 23, 1957 |
| 2,875,466 | Nyberg | Mar. 3, 1959 |
| 2,910,576 | Meese | Oct. 27, 1959 |
| 2,979,603 | Falge | Apr. 11, 1961 |